Jan. 21, 1969     K. H. CARPENTER     3,422,484
WASHER ARM
Filed Aug. 1, 1966
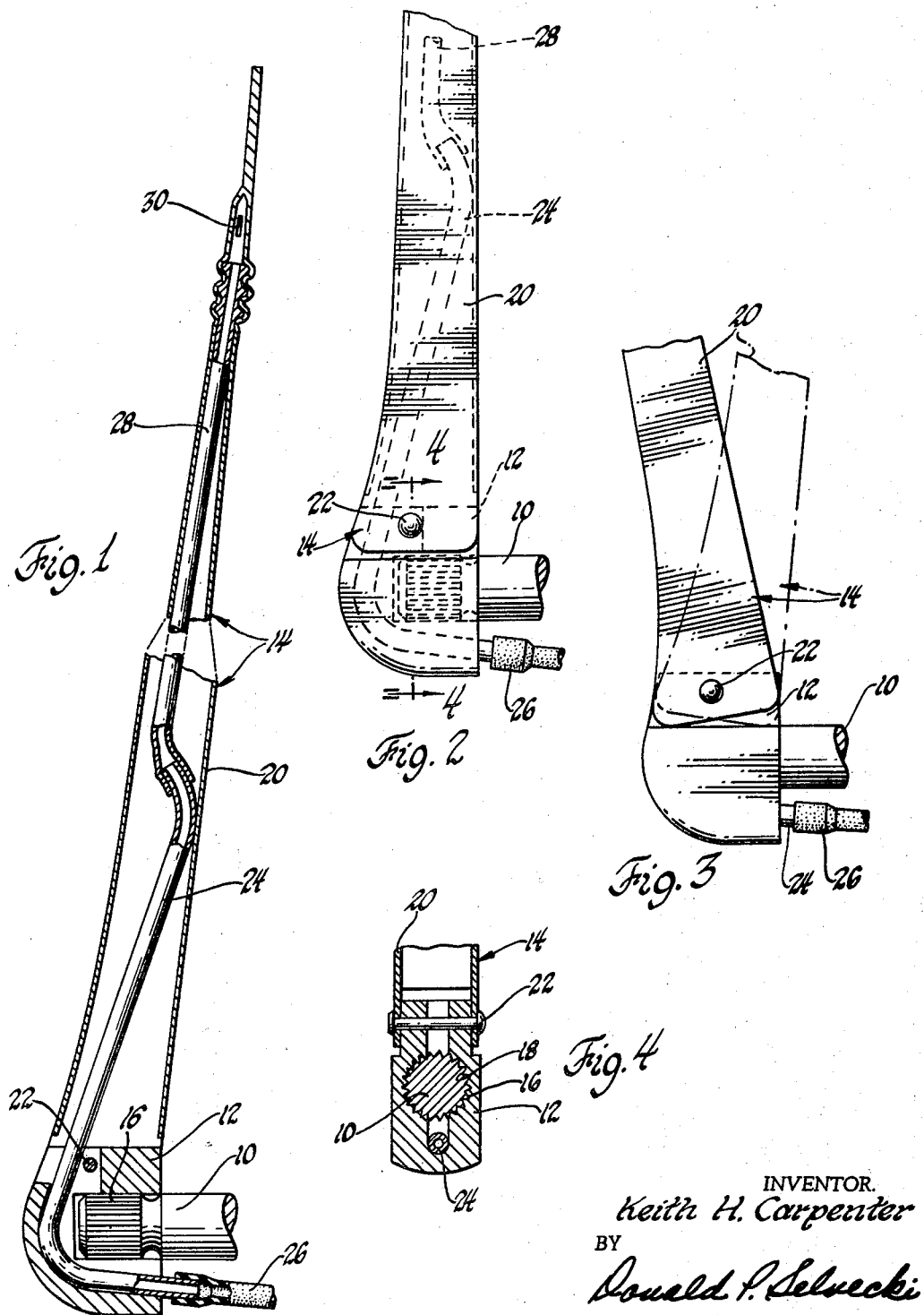
INVENTOR.
Keith H. Carpenter
BY
Donald P. Selvecki
ATTORNEY

United States Patent Office 3,422,484
Patented Jan. 21, 1969

3,422,484
WASHER ARM
Keith H. Carpenter, Kettering, Ohio, assignor to General Motors Corporation, Detroit, Mich., a corporation of Delaware
Filed Aug. 1, 1966, Ser. No. 569,456
U.S. Cl. 15—250.04                7 Claims
Int. Cl. A47l 1/02

ABSTRACT OF THE DISCLOSURE

In a preferred form, this disclosure relates to a wiper-washer arm assembly for use in cleaning a window of a vehicle. The wiper-washer arm assembly comprises a first arm section which is adapted to be drivingly connected with a drive member for imparting movement thereto, a second arm section pivotally connected to the first arm section for movement toward and from the window and which is adapted to carry a wiper blade for wiping the window, and an elongated, resilient tubular member in engagement with the first and second arm sections and which functions both as a spring to bias the second arm section toward the window to hold the wiper blade in pressure engagement therewith and as a conduit for directing washing fluid toward a dispensing nozzle carried by the wiper-washer arm assembly.

---

This invention relates to windshield wiping mechanisms and more particularly to a wiper arm having a windshield cleaning fluid carrying tube disposed therein which also serves as a hold-down spring.

Windshield wiper arms of common design are generally constructed having a portion journalled on a drive shaft adapted to impart oscillatory movement to the wiper arm across the windshield, an arm extension pivotable with respect to the portion journalled on the drive shaft, and a so-called hold-down spring engaging the portion journalling the drive shaft and the wiper arm extension to draw the extension toward the windshield being cleaned. Windshield washing apparatus is generally separate from the wiper arm and involves rather intricate mechanisms, for aiming and cycling the dispensed fluid toward a windshield in the path of the wiper arm.

It is an object of the present invention to provide a windshield wiper arm which utilizes a resilient tube that doubles as a hold-down spring and conduit for windshield washing fluid.

It is another object of the present invention to provide a windshield wiper arm having the characteristics set forth in the aforementioned objective without departing from substantially well-known wiper arm designs.

It is still another object of the present invention to provide a windshield wiper arm having a combination hold-down spring and a windshield washer fluid tube which is simple and economical to manufacture.

Further objects and advantages of the present invention will be apparent from the following description, reference being had to the accompanying drawings wherein a preferred embodiment of the present invention is shown.

In the drawings:

FIGURE 1 is a sectional view of the windshield wiper arm of the present invention.

FIGURE 2 is an elevational view of a portion of the subject invention, the combination fluid tube and hold-down spring being shown in its operative position.

FIGURE 3 is a partial elevational view of the wiper arm of FIGURE 1 showing the pivotability of the arm extension relative to the portion journalling the drive shaft.

FIGURE 4 is a partial sectional view taken along lines 4—4 of FIGURE 2.

Referring to FIGURE 1, a drive shaft 10 is arranged for oscillatory rotation in response to movement generated by a drive power source such as an electric motor or a fluid motor. A first end 12 of a wiper arm generally designated by the numeral 14 journals an end of drive shaft 10 and is non-rotatable with respect thereto. Serrations 16 externally formed on drive shaft 10 mate with splined portions 18 formed on an interior portion of first end 12 to guarantee no rotation between first end 12 and drive shaft 10. This relationship of parts is better seen in FIGURE 4.

Referring to FIGURE 1, wiper arm extension 20 is pivoted at point 22 so that extension 20 pivots at a right angle to the oscillation axis of drive shaft 10. In this manner arm extension 20 is movable perpendicular to the windshield being cleaned. Resilient tube 24 is carried through an aperture in first end 12 and is directed toward an interior portion of arm extension 20 tending to urge extension 20 toward the right or clockwise around pivot point 22 as viewed in FIGURE 1. Tube 24 is formed of a well-known resilient material such as stainless steel, fiberglass, or other material having high tensile qualities which is adapted to be made into tubular form.

Referring to FIGURE 2, tube 24 is shown in its operative position and therein is included resilient tubes 26 and 28, arranged to carry a fluid for washing the windshield from a reservoir connecting with tube 26 to a dispenser 30 connecting with tube 28.

An examination of FIGURE 1 shows that tube 24 substitutes for a conventional spring arrangement generally engaging an arm extension such as depicted herein by numeral 20, and a journalled end of a windshield wiper arm such as shown herein by the numeral 12. In addition, the resilient tube 24 serves to transport the windshield washing fluid from one end of the wiper arm to the other, at which point it is dispensed from dispenser 30 in the vicinity of the windshield. The dual performing tube 24 thereby provides a windshield wiping system so equipped with a dispenser located very near the windshield, which is advantageous from the standpoint of guaranteeing maximum contact of the dispensed fluid with the windshield to be cleaned, as well as providing a very simple means for biasing the windshield wiper arm toward the windshield a predetermined amount necessary to generate a good wiping action. Since resilient tube 24 is not attached to arm extension 20 at the point of contact, the contact point between these two members moves with the "rise and fall" of the windshield attempting to maintain a constant force moment. Ideally, this would lead to constant blade pressure independent of blade wipe position in the sweep. The advantages of the arrangement of the present invention are obvious when viewed from an economy standpoint and also from the standpoint of efficiency of the windshield wiping system so equipped.

While the embodiment of the invention as herein disclosed constitutes a preferred form, it is to be understood that other forms might be adopted.

What is claimed is as follows:

1. A wiper-washer arm assembly for use in cleaning a window of a vehicle comprising: a first arm section which is adapted to be drivingly connected with a drive member for imparting movement thereto; a second arm section pivotally connected to said first arm section for movement toward and from the window and which is adapted to carry a wiper blade for wiping the window; pivot means for pivotally connecting said second section to said first section; and a resilient tubular member in engagement with said first and second sections for biasing said second section about the axis of the pivot means toward the window to hold the wiper blade in pressure engagement therewith and for directing washing fluid toward a dispensing nozzle carried by the wiper-washer arm assembly.

2. A wiper-washer arm assembly as defined in claim 1 wherein said resilient tubular member is slidably engaged with said second section and wherein said tubular member slides on said second section to vary the biasing force and the moment arm of said tubular member between its contact point with said second section and the axis of said pivot means so that the wiper is maintained in substantially constant pressure engagement with the window while traversing different curvature portions thereof when moved thereacross.

3. A wiper-washer arm assembly as defined in claim 1 wherein said resilient tubular member is generally S-shaped and is disposed within said first and second arm sections, and wherein said S-shaped tubular member along its curved end portions engages opposed internal surfaces on said first and second arm sections.

4. A windshield wiper arm comprising: a first end adapted to be driven in an oscillatory manner by a power source and pivotable on the axis of the output portion of a power source; a second end extending from said first end and adapted to carry a wiper blade in contact with the windshield as a first end traverses an oscillatory path; and means carried within said first end and said second end to pivot said second end relative to said first end perpendicular to the axis of oscillation, said last-mentioned means arranged to act as a conduit for washing fluid directed from a reservoir to the second end of said wiper arm wherefrom cleaning fluid is dispensed on demand toward the windshield being wiped.

5. A windshield wiper arm according to claim 4 wherein said last-mentioned means is a resilient tube carried within said wiper arm firmly engaging said wiper arm at its pivotable end and having a reversely thrusting portion bearing on another portion of said wiper arm tending to urge the axis of said wiper arm toward the pivotable axis of said wiper arm.

6. A windshield wiper arm according to claim 4, wherein said last-mentioned means is a resilient tube passing through and rigidly held by said first end of the wiper arm and resiliently bearing against said second end of the wiper arm tending to move the wiper arm toward the windshield being wiped.

7. A windshield wiper arm according to claim 4, wherein said last-mentioned means is an elongated, substantially S-shaped resilient member connected on either end by less rigid fluid transporting apparatus adapted to transport a washing fluid from a reservoir to the extreme portion of said second end so that washing fluid is dispensed toward the windshield by a wiper proximate the point of contact of the wiper blade carried by said wiper arm to the windshield.

References Cited

UNITED STATES PATENTS

| | | | |
|---|---|---|---|
| 1,857,419 | 5/1932 | Williams | 15—250.04 |
| 3,234,579 | 2/1966 | Roscoe | 15—250.04 |

PETER FELDMAN, *Primary Examiner.*

U.S. Cl. X.R.

15—250.34